United States Patent [19]
Blahut et al.

[11] Patent Number: 5,539,449
[45] Date of Patent: Jul. 23, 1996

[54] INTEGRATED TELEVISION SERVICES SYSTEM

[75] Inventors: Donald E. Blahut, Holmdel; Edward S. Szurkowski, Maplewood, both of N.J.

[73] Assignee: AT&T Corp., Murray Hill, N.J.

[21] Appl. No.: 56,973

[22] Filed: May 3, 1993

[51] Int. Cl.⁶ .................................................. H04N 7/173
[52] U.S. Cl. .............................. 348/7; 370/60.1; 379/90; 455/4.2
[58] Field of Search ................................ 358/84, 85, 86; 348/7, 6, 12, 13; 455/3.1, 4.1, 4.2, 6.3; 375/60, 60.1, 61, 62, 77, 24, 29; 379/90, 201, 93, 94, 96; H04N 7/173

[56] References Cited

U.S. PATENT DOCUMENTS

| | | | |
|---|---|---|---|
| 4,450,481 | 5/1984 | Dickinson | 348/6 |
| 4,499,568 | 2/1985 | Gremillet | 369/30 |
| 4,616,263 | 10/1986 | Eichelberger . | |
| 4,709,418 | 11/1987 | Fox et al. . | |
| 4,763,191 | 8/1988 | Gordon et al. | 358/86 |
| 4,905,094 | 2/1990 | Pocock et al. | 358/342 |
| 5,057,932 | 10/1991 | Lang | 358/335 |
| 5,130,792 | 7/1992 | Tindel et al. | 385/85 |
| 5,132,992 | 7/1992 | Yurt et al. | 375/122 |
| 5,133,079 | 7/1992 | Ballantyne et al. | 455/4.1 |
| 5,164,839 | 11/1992 | Lang | 358/335 |
| 5,172,413 | 12/1992 | Bradley et al. | 348/7 |
| 5,247,347 | 9/1993 | Litteral et al. . | |
| 5,341,474 | 8/1994 | Gelman et al. | 348/7 |

FOREIGN PATENT DOCUMENTS

| | | | |
|---|---|---|---|
| 0334549 | 9/1989 | European Pat. Off. | H04L 27/00 |
| 0355697 | 2/1990 | European Pat. Off. . | |
| 0513763 | 11/1992 | European Pat. Off. | H04N 7/13 |
| 0188579 | 8/1987 | Japan | H04N 7/173 |

OTHER PUBLICATIONS

W. D. Sincoskie, "System Architecture for a Large Scale Video on Demand Service," *Computer Networks and ISDN Systems*, 22 (1991) 155–162.

*Primary Examiner*—David E. Harvey
*Attorney, Agent, or Firm*—Nicholas J. Skarlatos; David M. Rosenblatt; Geoffrey D. Green

[57] ABSTRACT

A system is disclosed for delivering audio and/or video signals to users in connection with the provision of interactive television services. Various sources of such signals are connected to a digital network, such as a packet network. Also connected to such network are control and application processors and interfaces to distribution arrangements such as cable television systems and telephone subscriber loops. Each user has a signal converter for receiving a digital signal from the distribution arrangement, converting such signal for viewing on a conventional television receiver and transmitting control packets to other elements of the system. The signal sources can include a data cache for storing recorded video and audio materials, a broadcast source for receiving broadcast signals, apparatus for composing multimedia signals from multiple sources and apparatus for running games. The various elements of the system can be situated at different geographical locations and operated by the control and/or application processors under software control to provide a variety of interactive television services.

15 Claims, 6 Drawing Sheets

INTEGRATED TELEVISION SERVICES SYSTEM

TECHNICAL FIELD

This invention relates to interactive television systems, and more particularly to systems for providing a variety of interactive television services to users via distribution systems such as cable television systems or telephone networks.

BACKGROUND OF THE INVENTION

Cable television systems have made possible the transmission of many channels of television programs to the homes of subscribers. Instead of being limited to the number of VHF and UHF channels that can be transmitted and received in a given area, the number of channels in cable systems is limited only by the transmission characteristics of the cable itself and the ability to compress the information in television programs into narrower-bandwidth channels. The advent of fiber-optic transmission systems for use in cable television networks has also vastly increased the number of channels available.

Such increase in channels has also given rise to proposals for interactive television systems wherein a subscriber can transmit information or requests back into the system, which information or requests may subsequently affect programs or information directed to such subscriber. There are a wide variety of applications for interactive television systems, such as video games, video catalog shopping, teaching systems, movies on demand and audio programs. Each application can be tailored for an individual subscriber, for example a subscriber may be able to select the language of the soundtrack in a movie. However, such systems typically require the ability (i) to control specific programs or information sent to each subscriber and (ii) to receive input messages or requests from the subscriber.

A headend-to-subscriber channel does not need the full bandwidth of the usual television cable channel if compression can be used. For example, if a television signal is digitized and compressed in accordance with the MPEG standard, it is possible to transmit sixteen television programs digitally over a single conventional 6 Mhz cable channel. Other program information, such as high-fidelity audio, still video pictures or text can also be sent in compressed form. By using a large number of conventional channels for ITV purposes, such as is now possible with optical fiber distribution systems, together with compression, it is conceivable that hundreds of virtual channels could be made available.

Systems are also becoming available for transmitting compressed and encoded television signals over telephone circuits. In one such system, 1.5 megabits/second of data, sufficient for one compressed and encoded television channel, can be transmitted from a telephone central office over a twisted-pair loop to a subscriber's premises, and 16 kilobits of data can be transmitted back to the central office, together with regular telephone service. Such a loop is known as an asymmetric digital subscriber loop.

With the wide deployment of digital communication systems, standardized digital transmission systems have become available in which data is transmitted in packet form over networks. One such network is an asynchronous transmission mode (ATM) network in which packets of varying length can be sent. Such packet networks can be used for carrying digitized television signals.

Clearly the means now exist by which tailored television signals can be delivered to individual users, such as by cable television systems, telephone networks, packet networks and satellites. Also, a large number of sources are available from which programs and interactive television applications can be provided. However, problems arise in interconnecting and controlling all the possible signal sources and means of delivery needed to provide interactive television services in a flexible and efficient manner.

SUMMARY OF THE INVENTION

A system is disclosed for delivering audio and/or video signals to users in connection with the provision of interactive television services. Various sources of such signals are connected to a digital network, such as a packet network. Also connected to such network are control and application processors and interfaces to distribution arrangements such as cable television systems and telephone subscriber loops. Each user has a signal converter for receiving a digital signal from the distribution arrangement, converting such signal for viewing on a conventional television receiver and transmitting control packets to other elements of the system.

The signal sources can include a data cache for storing recorded video and audio materials, a broadcast source for receiving broadcast signals, apparatus for composing multimedia signals from multiple sources and apparatus for running games. The various elements of the system can be situated at different geographical locations and operated by the control and/or application processors under software control to provide a variety of interactive television services.

These and other aspects of the invention will become apparent from the drawings and detailed description.

DETAILED DESCRIPTION

Figure 1:
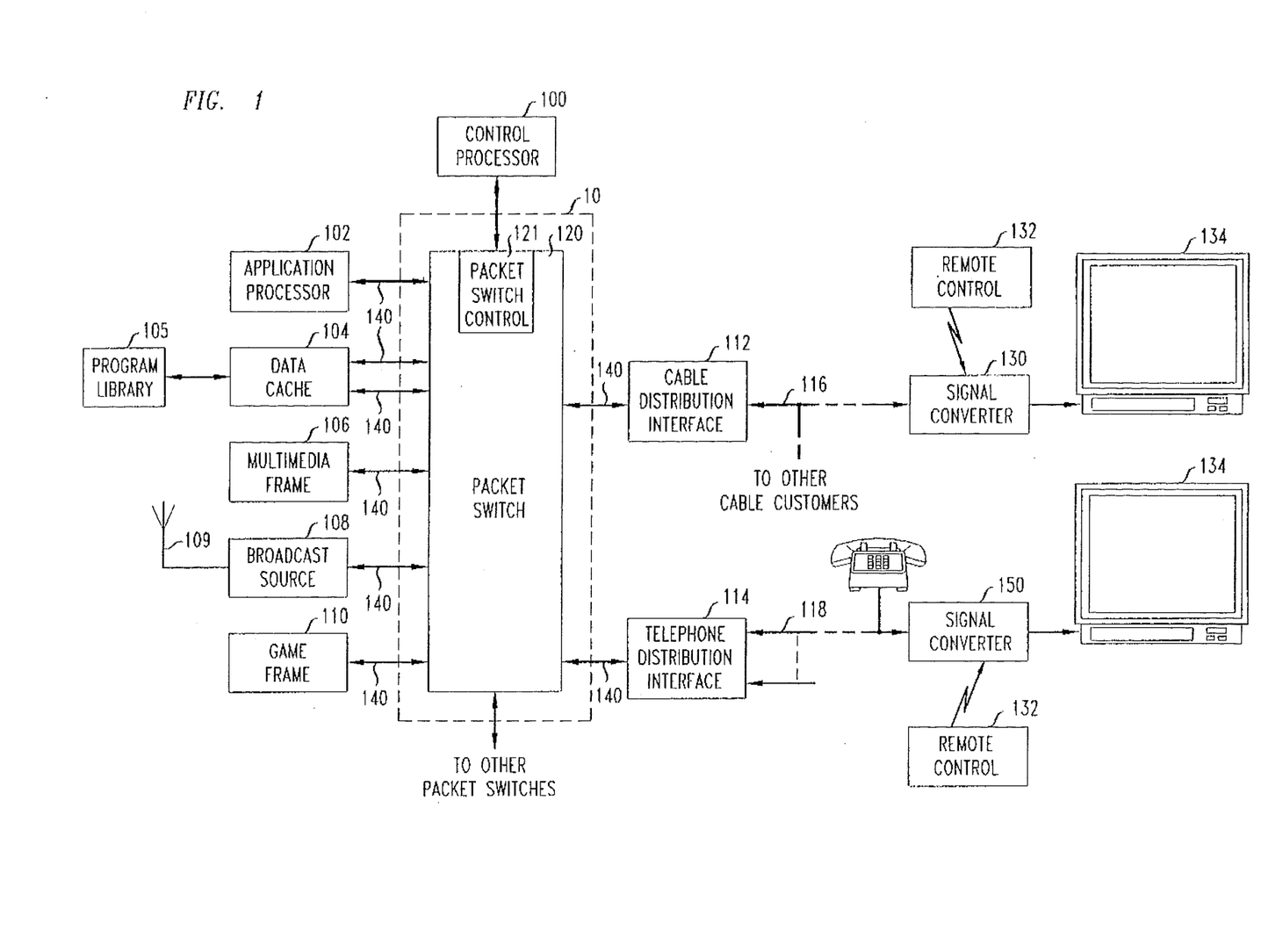
FIG. 1 is an overall block diagram of an integrated television services system configured in accordance with the invention.

FIG. 1 is an overall block diagram of a basic integrated television services system configured in accordance with the invention. The elements of the system communicate through packet network 10, which includes one or more packet switches 120. Such elements include control processor 100, application processor 102, application resources such as data cache 104, multimedia frame 106, broadcast source 108 and game frame 110 and one or more distribution interfaces 112 and 114, all of which are connected by links 140 to packet switch 120. Program library 105 is a high-capacity, long-term source of stored program material for data cache 104. Broadcast source 108 furnishes digitized and compressed program material from television broadcasts, cable systems, satellites or other means. In an exemplary embodiment, packet network 10 is an asynchronous transfer mode (ATM) network, links 140 are SONET OC-3 links, and packet switch 120 is an ATM switch such as the AT&T GCNS-2000 ATM switch.

In general, control processor 101 serves to interact with users selecting any of the various interactive services that may be provided by the system of the invention, and application processor 102 controls the services themselves. Control processor 101 also assigns the resources necessary to provide a service to a user. Application processor 102 and application resources such as data cache 104, multimedia frame 106, broadcast source 108 and game frame 110 can be duplicated as necessary to meet the capacity requirements of the system, but control processor 101 is preferably not duplicated because such processor maintains assignment records for the various resources in the system and making such records available to more than one processor, while achievable, is cumbersome. However, these task assignments to control processor 101 and application processor 102 are not inviolate, for example, in some applications it may be desirable to combine the functions of both processors in a single processor, or to use control processor 101 for certain applications.

Data cache 104 is a large random access memory for storing audio and video material in compressed and packetized form, such as the program server described in our copending patent application Ser. No. 07/997,985 filed Dec. 29, 1992. Data cache 104 can have one or more links 140 into packet network 10 depending on capacity requirements. Program library 105 can be a large-capacity system of any convenient type for storing program material, such as movies, musical selections, video clips, still frames and audio clips, in digitized and compressed form on devices such as magnetic tapes or optical discs and the like. Link 142 between program library 105 and data cache 104 can also be made via a separate ATM packet network, such as a SONET OC-3 network, or via packet network 10, depending on capacity and geographic limitations. Program library 105 is typically equipped to transmit a large quantity of data, such as digitized and compressed video and audio signals for complete movies, to data cache 104 in a relatively short time, as described in more detail in our above mentioned application.

It is contemplated that the various elements shown in FIG. 1 can be situated at different geographic locations. For example, packet switch 120, control processor 100, application processor 102, multimedia frame 106, broadcast source 108 and game frame 110 can be at a first location, data cache 104 can be at a second location and program library 105 can be at a third location. Other packet switches 120 and distribution interfaces such as 112 and 114 can be at still other locations. Connections between locations are SONET OC-3 links. It will be clear to those skilled in the art that numerous possible combinations of and locations for such elements are possible without departing from the spirit and scope of the invention.

Many interactive television services may be offered that incorporate broadcast television programs. Therefore, one of the application resources provided in the system of the invention can be a source of such programs, such as broadcast source 108, which receives one or more broadcast television signals from regular broadcasts, from satellite transmissions, from cable television systems or from any other appropriate means, all symbolized by antenna 109. Broadcast TV source 108 includes facilities for digitizing and compressing each received television signal and transmitting such signals in packetized form via packet network 10.

Multimedia frame 106 contains a number of units for composing compressed and packetized multimedia signals from a number of different sources, such as data cache 104, broadcast source 108 and internal text generators. Each such source typically provides a signal in digitized and compressed form. When a multimedia signal composed from multiple video and/or audio sources is to be transmitted to a user, one of such composing units is assigned to create the multimedia signal. Note that the input signals to multimedia frame 106, as well as output signals to users, are all transmitted in packetized form through packet network 10. A system that can be used for multimedia frame 106 is described in copending patent application Ser. No. 08/056,974 filed May 3, 1993.

Game frame 110 contains a number of units for generating compressed and packetized audio and video signals for use in computer games that may be offered as pan of an interactive television service. One such unit is assigned to each user of a computer game.

Application processor 102 and applications resources 104, 106, 108 and 110 can be used together in various ways to form what can be thought of as application servers for providing different ITV services. For example, a video-on-demand/enhanced-pay-per-view server could include application processor 102 and data cache 104; a multimedia ITV server could include application processor 102, data cache 104, multimedia frame 106 and broadcast source 108 and a game server could include application processor 102, multimedia frame 106 and game frame 110. Each application processor 102 can be used in more than one such server, up to the limit of its capacity.

Interfaces such as cable distribution interface 112 are typically located at cable television system headends and connected to signal converters 130 situated on cable customers' premises by distribution cable 116, whereby the signal converter 130 for each cable customer receives the same overall "downstream" signals broadcast to all cable customers served by the same cable distribution interface 112. However, as will be described, signal converters 130 can be enabled by control packets transmitted over cable 116 to receive only certain specified "virtual" channels from cable 116.

Interfaces such as telephone distribution interface 114 are typically located at telephone central offices and connected to signal converters 150 situated on telephone subscribers' premises by subscriber loops 118, whereby each telephone subscriber receives a different downstream signal. As will be described, signal converters 130 and 150 are configured for a cable customer and telephone subscriber, respectively.

Signal converters 130 and 150 convert the downstream signals into conventional television signals for display on television receivers 134. Users can send "upstream" signals to control processor 100 and applications processors 102 from input means such as remote control 132 that transmit control messages to signal converters 130 or 150, as the case may be. Other devices, such as processors, printers, video cameras, telephones and other input and output devices can be connected to signal converters 130 and 150 as required for the provision of ITV services.

The various data and control packets transmitted through packet network 10 each contain a header and a body. The header defines a "virtual channel" in which the packet is deemed to be transmitted. In data packets, the body contains data, such as part of a digitized and compressed audio or video signal. In control packets, the body contains information such as the address of the unit for which the packet is intended and an action to be performed. In the exemplary embodiment, each packet contains five bytes in the header and 48 bytes in the body. The header can include information such as polling addresses or virtual channel identities. Control packets are typically sent in one or more specifically assigned virtual channels, for example, channel "0."

Packet switch control 121 stores information specifying how to route packets arriving over links 140. Routing can be based on header contents; for example, certain virtual channels and/or certain polling addresses can be identified for transmission over a link. A packet arriving at packet switch 120 over any link 140 is then routed to one or more other links 140 depending on its header contents. Packet switch control 121 can itself receive packets from packet network 10, and, in the system of the invention, control processor 100 sends control packets as needed to packet switch control 121 containing such routing information.

In the exemplary embodiment, a television signal is made up of three separate data signals, one video and two audio (for stereophonic sound). Each signal is separately digitized and compressed and sent through packet network 120 as a packet stream in a separate virtual channel. Accordingly, three virtual channels are used for transmission of a single television signal. However, other embodiments are possible in which multiple audio channels are encoded and compressed together, such as the Dolby AC-2 system.

Figure 2:
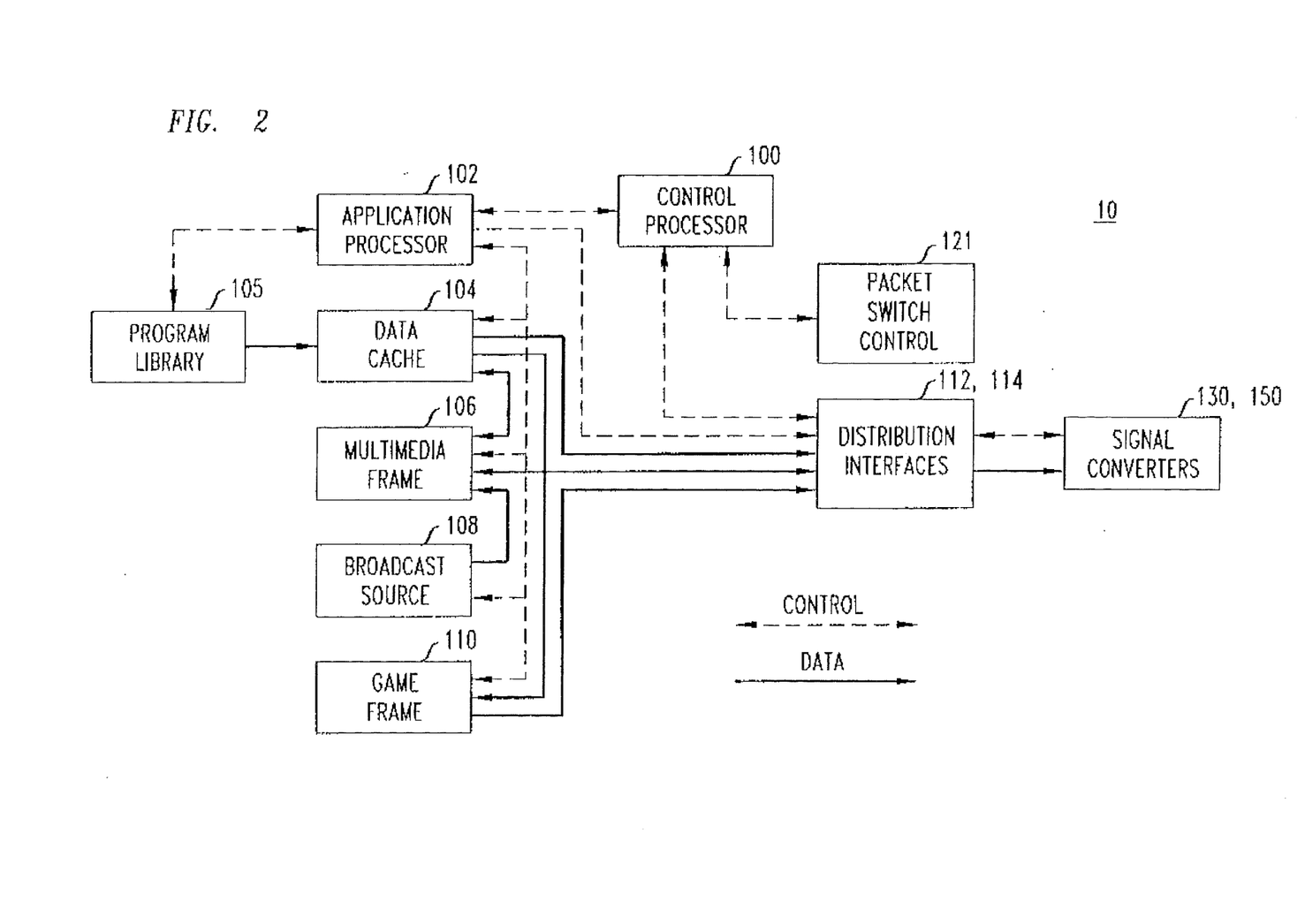
FIG. 2 is a block diagram showing the overall flow of control and data packets in a system configured in accordance with the invention.

FIG. 2 shows typical flows of data and control packets through packet network 10 and in other parts 6f the system. During the furnishing of ITV services, data packets containing audio and/or video information flow from application resources such as data cache 104, multimedia frame 106 and game frame 110 to signal converters 130 and 150. Such data packets can also flow between application resources, such as from data cache 104 to multimedia frame 106 and game frame 110 and from broadcast source 108 to multimedia frame 106. During interactions with users, control packets flow between signal converters 130 and 150 and control processor 100 and/or between signal converters 130 and 150 and application processor 102. Control processor 100 interacts with application processor 102 and with packet switch control 121 by means of control packets, and application processor 102 interacts with application resources 104, 105, 106, 108 and 110 by means of control packets. Data packets from program library 105 to data cache 104 can be sent via a direct link or via a packet network; even via packet network 10, if convenient. The link between application processor 102 and program library 105 carries only control packets and can be of lower capacity than links 140, for example, such link can be part of an Ethernet (tm) network. However, such link can also be a low-bandwidth virtual channel in packet network 10, if desired.

The flexibility of packet network 10 makes possible flows of data and control packets between any pair of terminals and from one terminal to groups of terminals. Possibly useful paths for control packets that are not shown are between signal converters 130 and 150 on the one hand to multimedia frame 106 and game frame 110 on the other. These paths may be desirable for use in time-dependent interactive applications using multimedia frame 106 and game frame 110 in which an, extremely fast response to an action by a user is desired. Multimedia frame 106 and game frame 110 will typically include processors that can generate and respond to such control packets. Similarly, if control processor 100 also performs the functions of application processor 102, paths for control packets will be needed from control processor 100 to the various resources 102, 104, 105, 106, 108 and 110.

In general, control processor 100 interacts with users to control requested services and to assign the various resources needed to furnish the services, including the necessary virtual channels in packet network 10 and the various other links in the system. During the delivery of a service by application resources 104, 106 and 110, under control of application processor 102, control processor 100 maintains supervision by responding to certain control packets from signal converters 130 and 150; application processor 102 responds to control packets from signal converters 130 and 150 specifically relating to an ITV service being delivered. However, as described above, application resources may be equipped to respond directly to control packets from signal converters 130 and 150.

Figure 3:
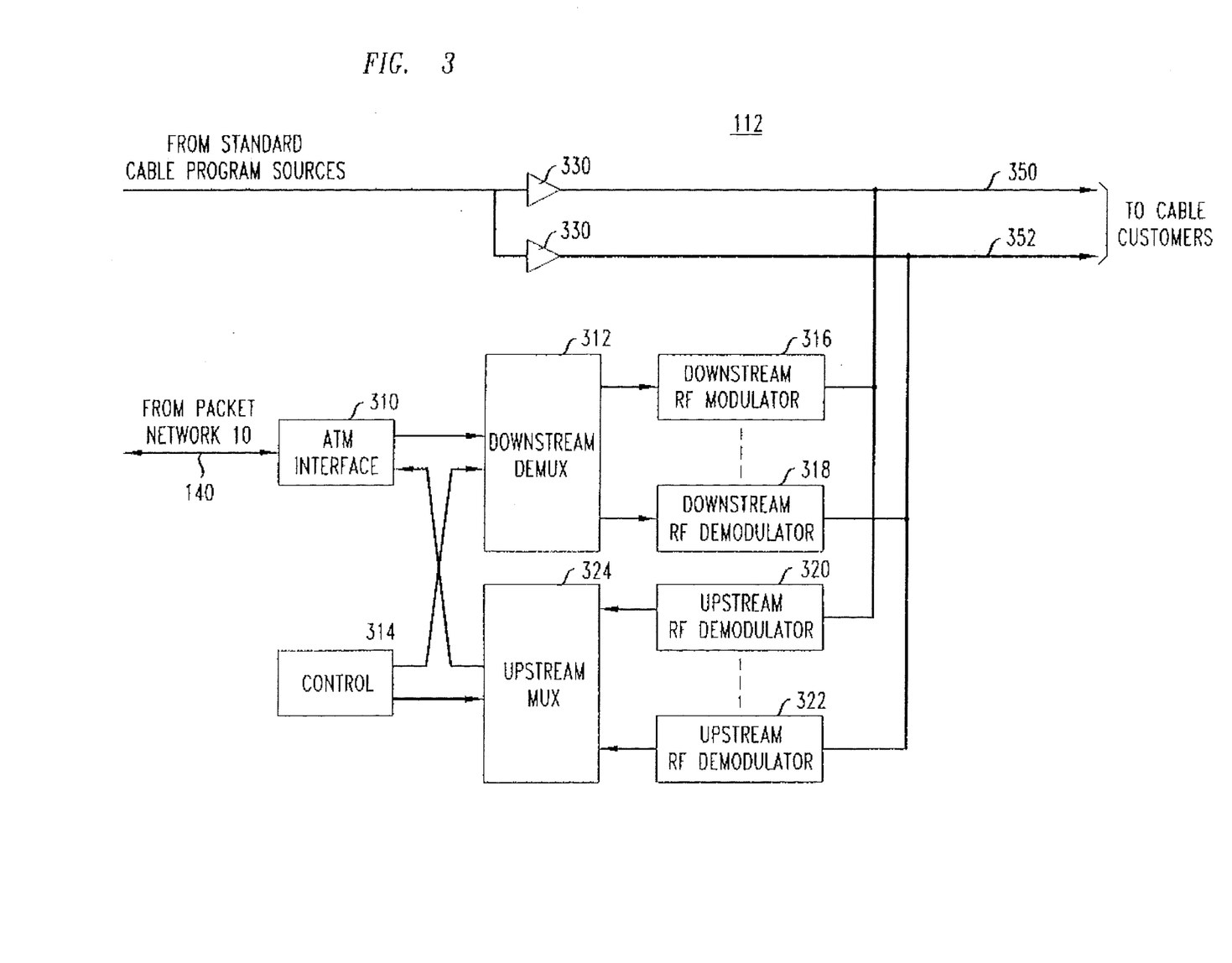
FIG. 3 is a block diagram of an interface for distributing integrated television services over a cable television system.

FIG. 3 is a block diagram of interface 112 for use at a cable television system headend for distributing integrated television services over a cable system in accordance with the invention. ATM interface 310 receives packets from packet network 10 over link 140, forwards data packets to downstream demultiplexer (DEMUX) 312 and forwards control packets addressed (in the body) to control 314. Certain types of control packets set up interface 310 to transmit packets over the various cable feeders originating at the headend, for example, feeders 350 and 352, based on the header contents of the packets. Thus, interface 112 also acts as a packet router or switch. Demultiplexer 312 routes all the data and control packets for a particular cable feeder to a downstream RF modulator, such as modulator 316 for feeder 350 and modulator 318 for feeder 352. Such control packets can, for example, include a converter address and information on virtual channels from which such converter is to receive packets containing audio and video data. These RF modulators convert the digital bit streams from demultiplexer 312 to modulated signals for transmission over one or more of the standard distribution channels (typically 6 mHz wide) in the cable system. Such modulation can be, for example, quadrature amplitude modulation such as 64 QAM. Other programs from standard cable program sources are modulated onto other channels and sent over other distribution channels in the cable system by amplifiers 330, as is well known in the art.

Control packets from signal converters 130 situated at cable customer locations are received by upstream RF demodulators such as demodulators 320 and 322. Such signals are typically sent in the 5–30 MHz band. Upstream multiplexer (MUX) 324 converts the bit streams from the various demodulators into appropriate virtual channels for transmission over packet network 10 via ATM interface 310. For example, control packets relating to particular ITV services can be assigned to a particular virtual channel assigned to such service and routed to the appropriate destination for such service.

Figure 4:
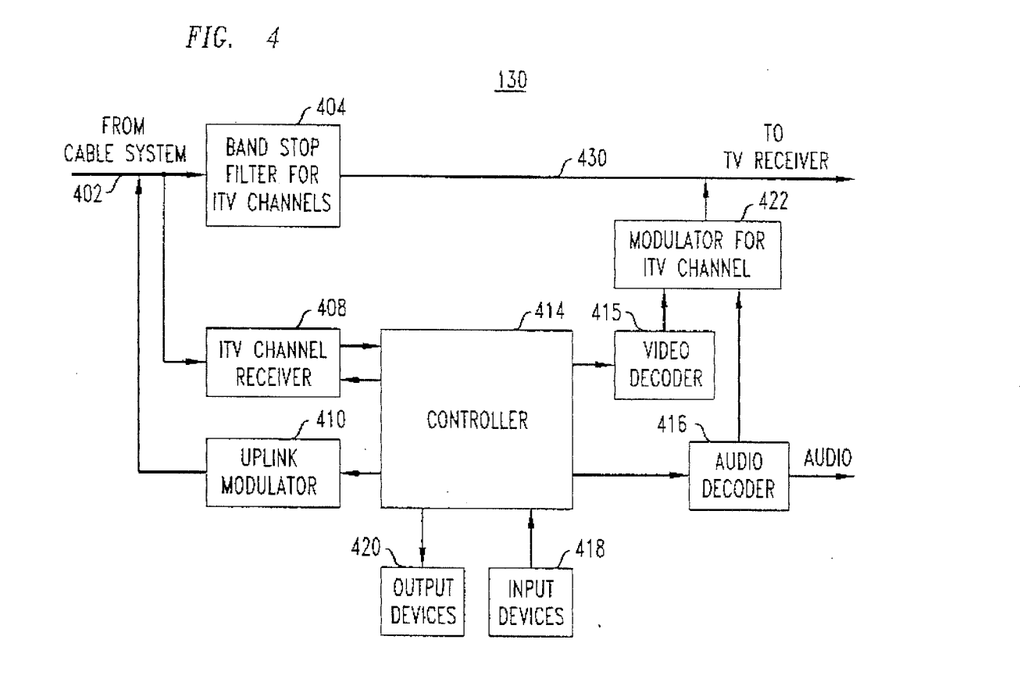
FIG. 4 is a block diagram of a signal converter for use by a cable television system customer.

FIG. 4 is a block diagram of a signal converter 130 for use at the premises of a cable customer receiving ITV services. A similar converter having additional features is described in copending application Ser. No. 07/965,492, filed Oct. 23, 1992. Input cable 402 is typically a coaxial cable or an optical fiber cable connected to the cable distribution system. Cable 402 is connected to inputs of band-stop filter 404 and ITV channel receiver 408 and to the output of uplink modulator 410. Cable 402 is pan of an input circuit (not shown), that also contains any interface apparatus, such as optical/electrical transducers and amplification and buffering circuits needed to connect the cable system to filter 404, receiver 408 and modulator 410. Such interface apparatus and amplification and buffering circuits are well known to those skilled in the art.

ITV channel receiver 408 is tuned to receive the cable channel over which the packetized digital information for the interactive television features is being transmitted. The actual cable channel or channels used for such purpose are assigned by the administrators of the cable system. If more than one such ITV channel is provided, one of the channels is usually considered the "default" channel, which is the channel used to initialize converters such as converter 130. Upon initialization, a converter can be transferred to a different ITV channel by means of a control message. The output of tuner 408 is a digital bit stream comprising the packetized digital information, which is forwarded to controller 414.

Controller 414 performs many functions and is typically a microprocessor with both random-access memory (RAM) and read-only memory (ROM). Controller 414 sends control messages to receiver 408 specifying the identity of the cable channel to be received, receives manual inputs from manual input devices 418, sends video packets to decoder 415 and audio packets to decoder 416 and transmits information to the cable headend via uplink modulator 410. Depending on the audio encoding standard used, an audio packet can contain information for more than one audio channel. Examples of input devices 418 are keyboards, handheld "mice" for use with video displays and infrared remote control devices, such as those used with television receivers and recorders, as indicated at 132 in FIG. 1.

Decoders 415 and 416 can also be microprocessors, such as digital signal processors, specifically programmed to decode compressed video or audio information, as the case may be, in accordance with the appropriate decoding algorithm, as is well known in the art. Other output devices 420 capable of receiving digital information, such as a printer, can be connected to controller 414 as desired.

Band stop filter 404 deletes at least one of the ITV channels, preferably the default channel, from the signal received from cable 402, passing the remaining channels to output cable 430. Modulator 422 modulates the television signal received from video decoder 415 and audio decoder 416 into one of the blocked ITV channels on output cable 430. Thus, converter 130 replaces the packetized digital signal received from the cable system in such ITV channel with the television signal from decoders 415 and 416. Such ITV channel can then be selected and viewed in the conventional way on a cable-ready television receiver connected to output cable 430. As described above, the television signal modulated into such ITV channel can be produced from ITV packets received over any of the ITV channels.

For applications in which audio programs are transmitted over an ITV channel, a separate audio output can be provided, as shown at 440, which can be used by equipment such as a high-fidelity sound system. Such audio output can have more than one channel, if desired.

As mentioned above, each packet received in an ITV cable channel contains identification of a virtual channel. Program information can be "multicast" on virtual channels for receipt by one or more subscribers. As also mentioned above, control messages are sent over at least one of the virtual channels not being used for program information. Different types of programs can be transmitted in each virtual channel, for example full motion video, still pictures, audio or text. When converter 130 is to receive a program from a virtual channel, a control message addressed to converter 130 causes controller 414 to store the identification of such virtual channel. Thereafter, controller 414 processes the contents of each packet identified as part of such virtual channel. Moreover, controller 414 can be set to process information in more than one virtual channel, if desired. For example, the audio and video portions of a movie can be sent simultaneously on different virtual channels, possibly with soundtracks in different languages on different channels.

Figure 5:
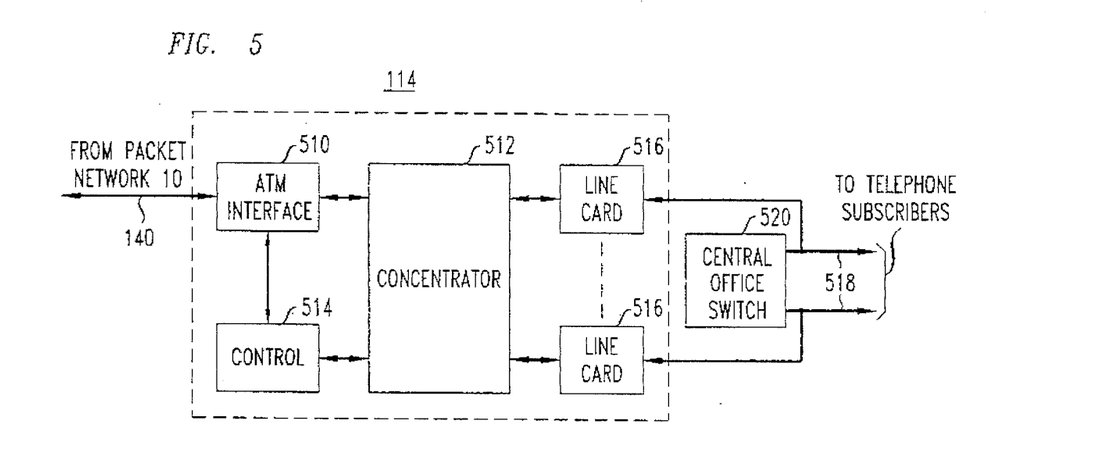
FIG. 5 is a block diagram of an interface for distributing integrated television services over telephone subscriber loops.

FIG. 5 is a block diagram of an interface 114 for distributing integrated television services over a telephone network. ATM interface 510 receives packets from packet network 10 and forwards dam packets intended for distribution by the interface to concentrator 512 and control packets intended for interface 114 to control 514. Certain control packets are used to set up concentrator 512 through control 514 to transmit specific virtual channels received from packet network 10 to each telephone subscriber via line cards 516 and telephone subscriber loops 518. Typically, a line card 516 is used for each telephone subscriber loop 518 over which interactive television services are to be provided and subscriber loop 518 is connected to both such line card and also to central office switch 520 for the provision of ordinary telephone service. Concentrator 512 demultiplexes and routes downstream packets from interface 510 to the appropriate line cards 516 and multiplexes upstream packets from line cards 516 for placement onto packet network 10 via ATM interface 510. Each line card 516 applies the downstream packets from concentrator 512 onto a telephone circuit 518 and retrieves upstream digital signals from telephone circuit 518 for multiplexing onto packet network 120 by concentrator 512.

Subscriber loops 518 are adapted for transmission of both ordinary telephone signals and the upstream and downstream control and data packets described above. Such a loop is sometimes called an asymmetric digital subscriber loop because the digital bandwidth toward the subscriber is much greater than the digital bandwidth away from the subscriber. The digital signals comprising the control and data packets can be transmitted in a mode known as "data over voice" in which the digital bandwidth is positioned to leave room at the lower end of the frequency spectrum for insertion of a voice signal for ordinary telephone service. Alternatively, the voice signal can also be digitized and sent as packets. Some of these techniques are described in U.S. Pat. No. 4,924,492 to Gitlin et al.

Figure 6:
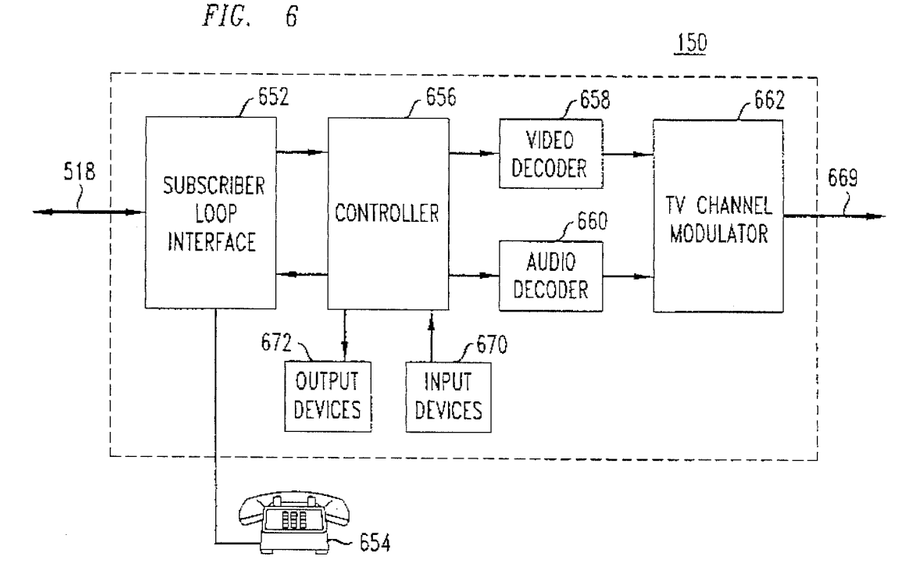
FIG. 6 is a block diagram of a signal converter for use by a telephone subscriber.

FIG. 6 is a block diagram of a signal converter 150 for use at the premises of a customer receiving ITV services over a telephone subscriber loop. Subscriber loop interface 652 is connected to subscriber loop 518 and retrieves the digital signal comprising the control and data packets transmitted by line card 516. Controller 656, which can be a microprocessor, routes video data packets to digital decoder 658 and audio data packets to audio decoder 660. Channel modulator 662 generates a conventional television signal from the outputs of decoders 658 and 660 and sends such television signal to the user's television receiver via lead 664. The subscriber's telephone 654 is also connected to interface 652.

Manual input devices 670 and output devices 672 are also connected to controller 656 as described for corresponding elements 418 and 420 in FIG. 4. On receipt of inputs from input devices 670, controller 656 generates appropriate control packets for transmission over subscriber loop 518 via subscriber loop interface 652.

Figure 7:
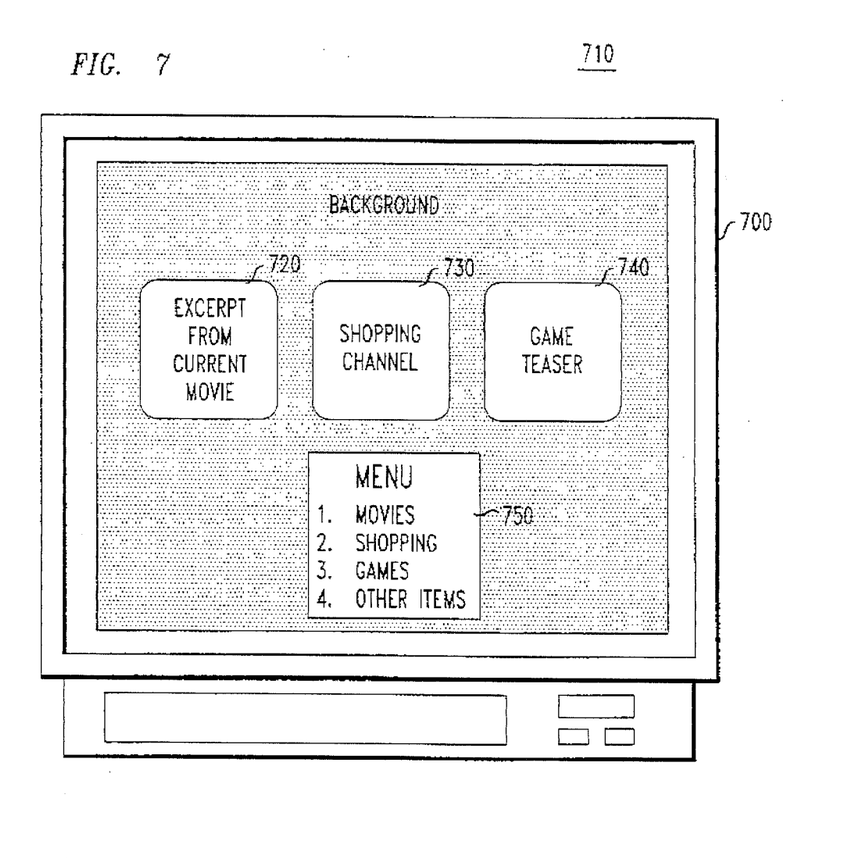
FIG. 7 is a diagram of a menu screens used that can be displayed by the system of the invention.

FIG. 7 is a diagram of an example of a menu screen 700 for use in interactions with users of the system of the invention. Such a menu screen can be displayed to a user first gaining access to the system on the user's television set, and is an example of a multimedia program composed in multimedia frame 106 (FIG. 1). Menu screen 700 consists of three scaled-down full-motion video images 720, 730 and 740 displayed in window overlays on a still-frame background 710 and with superimposed text 750. Display of such a screen is typically accompanied by appropriate background audio, such as a stereophonic musical selection.

Control processor 100 typically controls transmission of a menu screen, such as menu screen 700, to signal converters 130 and 150 for users not currently using ITV services (inactive users) and monitors uplink messages from such signal converters. The menu screen is somewhat analogous to dial tone in a telephone system, and can be "broadcast" to multiple users by transmitting the audio and video portions of the screen over dedicated virtual channels in packet network 10 and enabling signal converters 130 for idle cable-customer users (and concentrator 512 for idle telephone-subscriber users) to receive such dedicated virtual channels. However, there can be multiple menu screens for different groups of users who, for example, subscribe to different packages of interactive television services.

To generate menu screen 700, application processor 102 assigns a composing unit in multimedia frame 106 and control processor 100 assigns virtual channels in packet network 10 for routing the appropriate audio and video signals for the elements in the menu screen, in digitized and compressed form, to multimedia frame 106 and such composing unit. The full-motion video packets for the movie excerpt to be shown in window 720 and the game teaser to be shown in window 740 and audio packets for the background audio are stored in data cache 104. The video signal for the shopping channel to be shown in window 730 is supplied by broadcast source 108. The still-frame background is stored and the text is generated in the composing unit. Thus, four virtual channels through packet switch 10 from data cache 104 to multimedia frame 106 are needed for the current-movie video, the game-teaser video and the stereophonic background audio; one virtual channel from broadcast source 108 to multimedia frame 106 is needed for the shopping channel video and three virtual channels are needed from multimedia frame 106 to distribution interfaces 112 and/or 114 are needed for the multimedia signal (one video, two audio) for the menu screen itself.

In order to more fully explain the operation of the system of the invention, reference will be made to the flow chart of FIG. 8, which represent an interaction in which a cable-customer user requests a movie from a video-on-demand service and the movie is presented using apparatus as shown in FIG. 1. In the numbered steps shown in FIG. 8, a "C" indicates that control processor 100 controls the step and an "A" indicates that application processor 102 controls the step.

Figure 8:
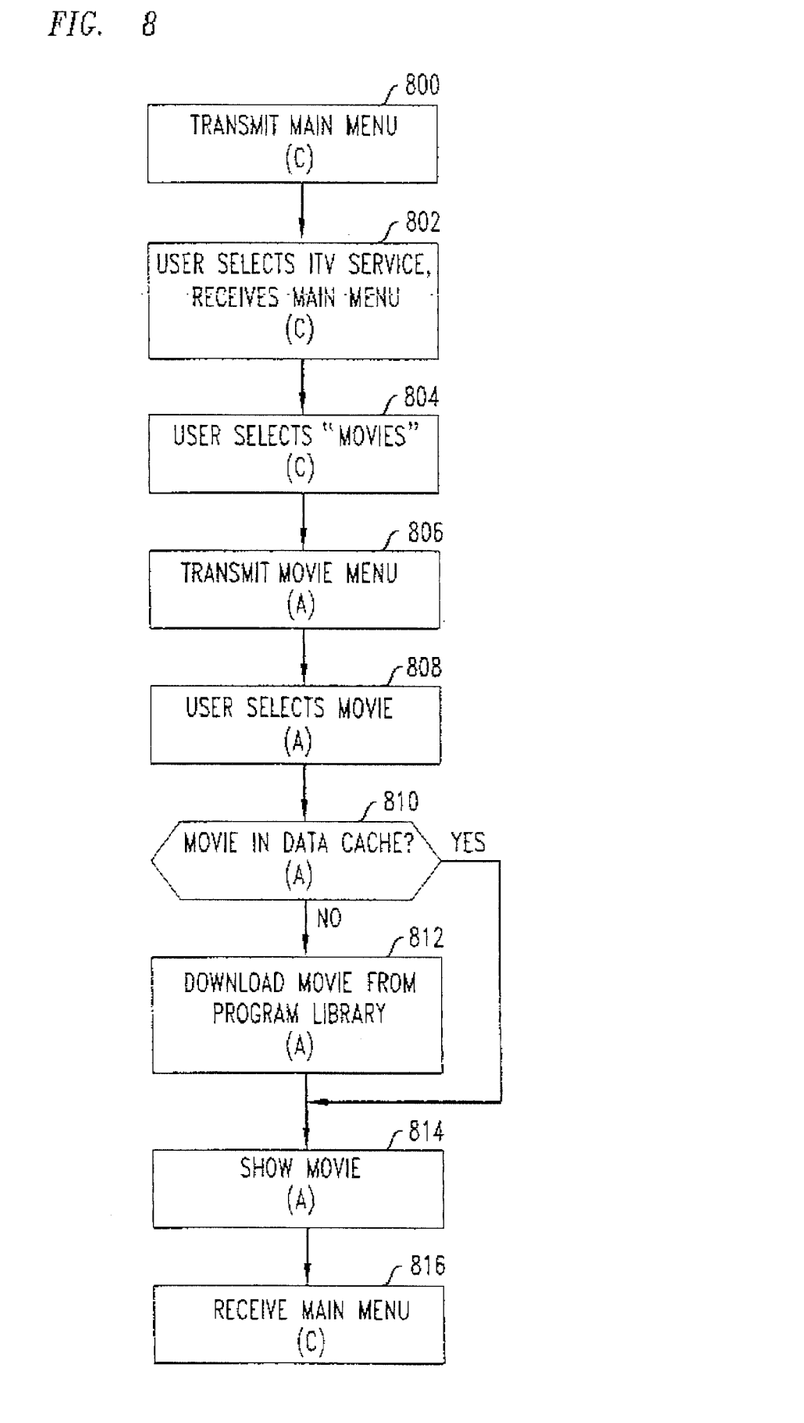
FIG. 8 is a flow chart showing the operation of the invention in selecting and showing a movie.

Referring now to FIG. 8, control processor 100 causes a menu, such as menu screen 700, to be received by signal converters 130 and 150 of all inactive users (step 800). A user requests a particular ITV function by first selecting the channel on which the ITV service is furnished, which causes the main menu to appear on the user's television set (step 802). Then, using an input device such as remote control 132, the user selects the "Movie" category (step 804). This causes signal converter 130 to transmit a control packet addressed to control processor 100 indicating the type of ITV service requested. Control processor 100 then assigns virtual channels for transmission of the movie to the requesting user and initiates a movie selection process in application processor 102 for the user. The movie selection process causes one or more menu screens for movie selection (which can be created in multimedia frame 106) to be transmitted to the requesting user (step 806). Control packets from the user are directed to application processor 102 during the selection process. When the user selects a movie (step 808), application processor 102 determines whether the movie is stored in data cache 104 (step 810). If not, then application processor 102 causes program library 105 to download the movie (at high speed) to data cache 104 (step 812).

As described in our above mentioned application, various audio/video materials are stored in a large random-access memory, such as data cache 104, in compressed and packetized form and retrieved for a given user by referring to a pointer or pointers associated with that user. Commands from the user can modify the pointers; thus, the user can request actions such as pause, rewind, fast forward and the like. Such commands entered by the viewer on an input device such as remote control 132 are sent by signal converter 130 or 150 to application processor 102 in the form of control packets. Application processor 102 then forwards the appropriate control packets to data cache 104 to cause the requested action.

When application processor 102 confirms that the requested movie is stored in data cache 104, a display process is initiated in application processor 102 that causes the movie to be transmitted from data cache 104 to the user over the assigned virtual channels and interacts with the viewer and data cache 104 by means of control packets to control the showing. When the showing is finished, the associated process in application processor 102 terminates and control for such user reverts to control processor 100, thereby causing the user to again receive the main menu (step 816). Control processor 100 can then reassign the virtual channels assigned to showing the movie for other purposes.

Other important activities to be performed in the ITV system of the invention include maintaining records such as customer profiles specifying the services that individual users are authorized to receive and, for billing purposes, activity records of services actually provided. Such record maintenance can be performed by application processor 102, control processor 100 and/or a separate billing processor (not shown) connected to packet network 10. Typically, customer profiles are maintained in control processor 100 and activity records in application processor 102. If a separate billing processor is used for customer accounts, application processor 102 can be configured to periodically transmit accounting data to the billing processor via packet network 10.

The invention has been shown and described with reference to particular embodiments. However, it will be understood by those skilled in the art that various changes may be made therein without departing from the spirit and scope of the invention.

What is claimed is:

1. An interactive system for delivering information programs comprising data packets to users via a local exchange telephone network, the data segments being transmitted to users in telephone transmissions in response to user commands received over the telephone network, the interactive system comprising:

a packetized network;

network routing control coupled to the packetized network for assigning communications paths through the packetized network and enabling transmission of data packets and control packets on the paths through the packetized network;

at least one information source coupled to the packetized network for providing at least data packets to the packetized network;

a local exchange telephone network interface coupled between the packetized network and the telephone network for providing user commands from the telephone network to the packetized network and providing at least data packets from the packetized network to the telephone network; and a controller coupled to the packetized network for receiving user commands from the packetized network and transmitting control packets to the at least one information source and the telephone network interface, the controller, in response to received user commands,
  instructing the network routing control to assign a path in the packetized network,
  instructing the at least one information source to provide data packets on the assigned path through the packetized network, and
  instructing the telephone network interface to receive at least the data packets placed on the assigned path of the packetized network and modulate the received data packets in the telephone transmissions to the user.

2. The system of claim 1, wherein the system comprises a plurality of different information sources coupled to the packetized network, and in response to multiple user commands from the same user, the controller in real-time instructs the different information sources to output different data packets on the same assigned path through the packetized network and coordinates the timing and content of the different data packets output from different selected information sources so as to deliver interactive information programming to the user.

3. The system of claim 2, wherein the plurality of information sources comprise information sources selected from the group consisting of a memory storage device for storing multi-media signals, a broadcast source, a multi-media frame server and a game frame server.

4. The system of claim 1, wherein the local exchange telephone network forms a non-packetized telephone network and the local exchange telephone network interface forms a packetized network to non-packetized telephone network control interface.

5. The system of claim 1, wherein the packetized network forms an ATM network.

6. An interactive system for delivering information programs comprising data packets to users over a cable television distribution system, the data packets being transmitted in television transmissions of the cable television distribution system in response to user commands received over the cable television distribution system, the interactive system comprising:

a packetized network;

network routing control coupled to the packetized network for assigning communications paths through the packetized network and enabling transmission of data packets and control packets on the paths through the packetized network;

at least one information source coupled to the packetized network for providing at least data packets to the packetized network;

a cable television distribution system interface coupled between the packetized network and the cable television distribution system for providing user commands from the cable television distribution system to the packetized network and providing at least data packets from the packetized network to the cable television distribution system; and a controller coupled to the packetized network for receiving user commands from the packetized network and transmitting control packets to the at least one information source and the cable television distribution system interface, the controller, in response to received user commands,
  instructing the network routing control to assign a path in the packetized network,
  instructing the at least one information source to provide data packet on the assigned path through the packetized network, and
  instructing the cable television distribution system interface to receive at least the data packets placed on the assigned path of the packetized network and modulate the received data packets in the television transmissions to the user.

7. The system of claim 6, wherein the system comprises a plurality of different information sources coupled to the packetized network, and in response to multiple user commands from the same user, the controller in real-time instructs the different information sources to output different data packets on the same assigned path through the packetized network and coordinates the timing and content of the different data packets output from different selected information sources so as to deliver real-time interactive information programming to the user.

8. The system of claim 7, wherein the plurality of information sources comprise information sources selected from the group consisting of a memory storage device for storing multi-media signals, a broadcast source, a multi-media frame server and a game frame server.

9. The system of claim 6, wherein the cable television distribution system forms a non-packetized cable television distribution system and the cable television distribution system interface forms a packetized network to a non-packetized cable television distribution system control interface.

10. The system of claim 6, wherein the network forms an ATM network.

11. A real-time interactive system for delivering information programs to users over a distribution system, the information programs being transmitted to users in distribution transmissions of the distribution system in response to user commands received over the distribution system, the interactive system comprising:

a packetized network for the transmission of data packets collectively forming information programs and control packets forming control signals;

network routing control coupled to the packetized network for assigning virtual communications paths through the packetized network and enabling transmission of data packets and control packets on the virtual paths through the packetized network;

a plurality of information sources coupled to the network for providing at least data packets to the packetized network;

a distribution interface coupled to the network and the distribution system for providing user commands from the distribution system to the packetized network and providing at least data packets from the packetized network to the distribution system; and a controller coupled to the packetized network for receiving user commands from the packetized network and transmitting control packets to the information sources and the distribution interface, the controller, in response to a received user command, instructing the routing control to assign a virtual path in the packetized network, instructing in real-time selected information sources to output selected data packets on the assigned virtual path through the packetized network, the selected information sources and selected data packets being selected in accordance with the received user command, coordinating the timing and content of the selected data packets output from different selected information sources to form a composed information program, and instructing the distribution interface to receive the selected data packets placed on the assigned virtual path of the packetized network by the selected information sources and modulate the received data packets in the distribution transmissions to the user.

12. The system of claim 11, wherein the distribution system comprises one of a cable television system and a telephone network, and wherein the distribution interface comprises one of a packetized network to a cable television distribution system control interface and a packetized network to a telephone network control interface, respectively.

13. The system of claim 12, wherein the distribution system comprises a non-packetized distribution system.

14. The system of claim 11, wherein the network forms an ATM network.

15. The system of claim 11, wherein the plurality of information sources comprise information sources selected from the group consisting of a memory storage device for storing multi-media signals, a broadcast source, a multi-media frame and a game frame.

* * * * *